Nov. 10, 1964   D. G. KELEMEN   3,156,549
METHOD OF MELTING SILICON
Filed April 4, 1958
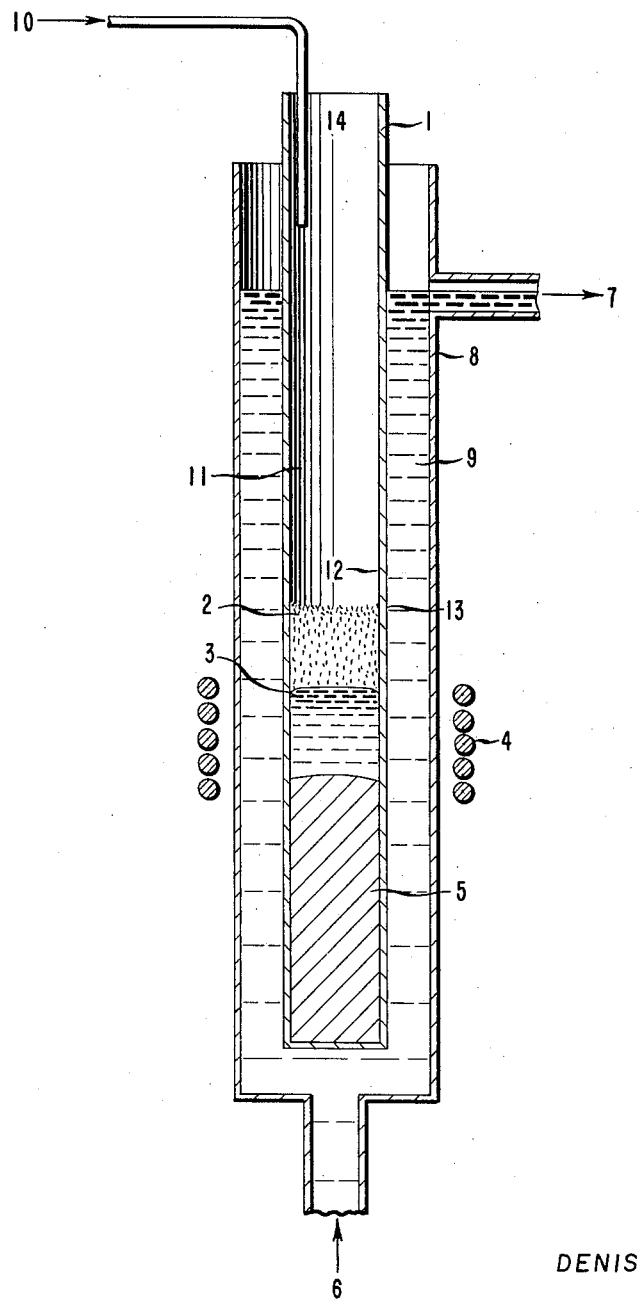
INVENTOR
DENIS G. KELEMEN
BY *Francis J. Crowley*
ATTORNEY 3,156,549
METHOD OF MELTING SILICON
Denis G. Kelemen, Wilmington, Del., assignor to E. I. du Pont de Nemours and Company, Wilmington, Del., a corporation of Delaware
Filed Apr. 4, 1958, Ser. No. 727,023
1 Claim. (Cl. 65—32)

This invention relates to melting silicon.

High-purity silicon is an excellent semiconductor, and for this reason, it is valuable in the manufacture of electronic devices, such as transistors. One of the most successful processes for producing high-purity silicon is by the vapor phase reduction of silicon tetrachloride with zinc. The silicon obtained by this reduction or other processes usually requires melting for the purpose of densification, doping, or obtaining a desired crystal form. The melting of silicon would appear to be a relatively simple operation, but in fact, it is attended by many difficulties. There is the problem of contamination from the crucible in which the melting is carried out. Experience has shown that even where the best materials of construction are used, contact between the molten silicon and a hot containing wall inevitably introduces impurities into the silicon. Moreover, if the solidification of the silicon is conducted in the melting crucible, the latter usually shatters and breaks during the cooling. In addition to this, some of the crucible wall adheres to the surface of the solidified silicon. This adhering material is usually dissolved away by hydrofluoric acid, and even though highly pure acid is used, it is still possible to encounter undesirable contamination. For most uses, such minute contamination would be negligible, but for semiconductor purposes, every atom of an undesirable impurity degrades the silicon.

It is, therefore, an object of this invention to provide an improved process for melting silicon in a container without encountering undesirable contamination from the container material. It is another object of this invention to melt and solidify silicon within a container without encountering sticking between the silicon and the container. It is another object of this invention to use a container to solidify silicon and to separate the solidified material and reuse the container for successive melting and solidification. It is a still further object of this invention to provide a process which melts and solidifies silicon into a solid object of uniform composition.

These and other objects of the invention are accomplished by the process comprising conducting the following steps in a non-contaminating environment: subjecting silicon to a high frequency electromagnetic field within a nonconducting container which is exteriorly contacted with a nonconducting fluid coolant to maintain its temperature below the melting point of silicon, and melting said silicon with the energy of said field.

In another embodiment, silicon is first preheated to a temperature which makes it sufficiently conductive to be further heated when placed in a high frequency electromagneitc field. Preheating can be accomplished in several ways. One method consists of heating a conductor material, for example graphite, in the electromagnetic field of an induction coil and allowing the heat from the conductor to radiate to the silicon. The preheated silicon is then introduced into a high frequency electromagnetic field within a nonconducting container which is being cooled below the melting point of silicon by having a fluid coolant, such as water, contacting and flowing over its exterior surface. The high frequency electromagnetic field is created by an induction coil surrounding the container, but the field does not materially affect the container or the fluid coolant since they are nonconducting. However, there is a direct inductive coupling with the preheated silicon, and the energy transferred is sufficient to heat it to the melting point. When the melting point is reached, the energy is cut off; or if the coil is not tall enough to create a field for the complete charge at one time, either the coil or the container is moved so that the whole charge is eventually passed through the high frequency electromagnetic field and melted. The separation of the field and the molten silicon will cause the melt to solidify within the fluid-cooled container, and by carrying out the melting and solidifying in the container in this manner, contamination, sticking between the silicon and the container, and destruction of the container are avoided. Furthermore, one of the surprising advantages is that there is sufficient shrinkage of the silicon upon cooling to allow easy removal of the solid silicon (i.e., the ingot) from the container. Both the preheating step and the melting and solidifying are carried out under a blanketing gas, such as argon, to protect the silicon from contamination by air at the elevated temperature of the operation.

The accompanying drawing is presented to show an application of the invention to the melting and solidification of silicon in a container without encountering contamination. Silica container 1 is the vessel in which the melting and solidification is carried out. It is provided with an inlet 10 for introducing a noncontaminating purging and blanketing gas, e.g., argon, which is continuously flowed through vapor space 11, and out of top opening 14. Cooling of the melt-contacting surface 12 of the container is accomplished by flowing a dielectric fluid coolant, preferably water, over the outer surface 13 of the container wall. To provide highly efficient and easily controlled cooling, silica container 1 is provided with an outer jacket 8 of a dielectric material, preferably silica, to contain the cooling water. The water is flowed from inlet 6 up through annular space 9 to outlet 7. A high frequency induction coil 4 is provided for heating the silicon by direct coupling through the dielectric coolant. This coil is comprised of a conventional water cooled copper induction coil, and it is supplied from a suitable source of high frequency electric current. The application of the inducted heat energy is controlled by regulation of the power source and by moving the induction coil 4 or the container 7 with respect to each other. It is preferable to melt the silicon from the bottom upward. In the present case, the induction coil 4 is supported by a movable device (not shown) and the container 1 is held stationary. Since the silicon normally has extremely low electrical conductivity, its temperature must be raised until it becomes sufficiently conductive to be heated effectively by direct coupled induction. Preferably, the silicon should be preheated to about 800 to 1000° C., before starting induction heating. This preheating is most easily done by introducing a portion of the silicon charge into the container and heating it by radiation from an inductively heated graphite rod. As soon as the desired temperature is reached, the graphite rod is removed and the direct coupled inducted heat energy is applied to melt the initial portion of the silicon charge. The flow of cooling water is started at this time, and the rest of the silicon can be introduced through top 14 as soon as there is sufficient radiation to heat the feed. The residual feed may be added all at once, or it may be added gradually. With the latter method, a somewhat larger ingot may be produced in the same size container, and therefore it is a preferred procedure. As induction coil 4 is slowly raised, the field of inducted heat energy moves away from a portion of the molten silicon 3, and it solidifies to become a portion of ingot 5. By gradually raising the induction coil, unmelted silicon 2 will melt and solidify to complete the ingot.

The following examples illustrate the invention in detail.

*Example I*

The apparatus for melting the silicon was as shown in the drawing. With the exception of the coil, all parts were clear, fused silica ⅛″ thick. The outside jacket was 12″ in length. The container had an inside diameter of 2″ and a length of 11″. The annular space between the melting container and the surrounding wall was ¼″ in width. A water cooled copper induction coil 1″ in height and 3″ in diameter having 5 turns with a 450-kc., 20-kw. power input from a vacuum tube oscillator was provided for heating the silicon by direct coupling. Means for raising the induction coil slowly were provided. Essentially, this consisted of a screw type, motor-driven elevator suitable for raising the coil container at a rate of from 1 to 6″ per hour. To prevent bridging of the unmelted particulate silicon, a silica rod was inserted from above and used as a poker to insure that all the silicon dropped into the melt. The silicon to be melted and consolidated consisted of particulate material in the form of needles and aggregates, as formed in the vapor phase reduction of high purity silicon tetrachloride by high purity zinc.

A single small cylindrical ingot or slug of pure silicon weighing approximately 50 grams was placed in the container. After starting the flow of argon to purge the air from the container, a graphite rod was inserted temporarily into the container and heated to about 2,000° C. by induction, and sufficient heat radiated to the ingot to raise its temperature to about 900° C. The graphite rod was then withdrawn, and the tube filled with the particles and aggregates of pure silicon, and the induction heating started by energizing the coil. Water cooling of the silica container wall was started immediately thereafter. Water was circulated at a rate of 10 liters per minute maintaining the inner wall of the silica container between 700 and 800° C. The induction coil, which was initially at the bottom of the container, melted the preheated slug, and in about 10 minutes the adjacent particulate silicon, being heated by radiation from the melting slug, became high enough in temperature (about 900° C.), to become sufficiently conducting to be readily heated by the induction source. Upon melting this part of the charge, the full field of applied heat energy was raised relative to the melt by raising the coil at a rate of 4″ per hour. As the coil was raised, the molten portion at the bottom of the container was removed from the full application of heating energy, and this portion solidified and slowly cooled. After the induction coil had been raised a total of 8″ the entire charge of particulate silicon had been melted and solidified into an ingot. This finished ingot did not adhere to the silica container, and it could be removed without damage thereto. The ingot was of very high quality, being equal in purity to the feed, and it was satisfactory for use in the manufacture of silicon diodes, transistors, rectifiers, and other critical electrical semiconductor devices.

*Example II*

The apparatus and procedure of Example I was followed except that the residual feed was allowed to gradually fill the container at the rate of about 10 grams per minute after the starting slug was preheated in the manner of the previous example. Approximately 10 minutes after the field was applied, the coil was raised from the bottom of the container at the rate of about 5″ per hour. After a total of 1200 grams of silicon was added, the feed was stopped. However, the coil was kept moving until it traveled the length of the inside of the container, and then its power source was cut off. After cooling to room temperature, the argon flow was stopped, and the ingot was easily removed from the container. This ingot was uniform in composition, and it was suitable for the manufacture of electronic devices.

*Example III*

The apparatus used is shown in the drawing, and it is the same as that of Example I except that the water-cooled induction coil is a 15-turn coil 3″ in height and 3″ in diameter, with a 450 kc., 20 kw. power input from a vacuum tube oscillator. The bottom of this coil is level with the bottom of the container. A 375 gram charge of preheated silicon particles of semiconductor purity is placed in the container under cover of hydrogen gas, and the entire charge is melted and held just above its melting point by the high frequency heating of the induction coil through the cooled nonconducting wall of the container. The fluid coolant in the annular space around the container is air-fluidized silica, and its upward flow is adjusted so that the temperature of the container wall remains between 700° C. and 800° C. during the operation. A clear silica tube ⅝″ in diameter and 24 inches long which is attached to a vacuum source is inserted vertically into the melt until its lower end is close to the bottom of the container. Vacuum is then applied to the upper end of the tube, and a large portion of the molten silicon is quickly drawn up into the tube and almost instantaneously solidified. This tube with the solidified silicon is removed from the container, and after cooling to room temperature, it is broken to recover a solid rod about 22 inches long. The silicon remaining in the container (about 100 grams) is kept molten, and another charge of about 275 grams is added, whereupon the melting and casting operation is repeated. The product silicon in the rod is uniform in quality, and there is no change in purity as a result of the melting operation.

In the above examples, the silicon was preheated in the melting container; however, it is also within the scope of the invention to preheat the charge in a non-contaminating environment outside the container and then to introduce the charge into the electromagnetic field which is within the aforementioned vessel.

The process of this invention should be conducted in a noncontaminating environment if a product of maximum purity is desired. This noncontaminating environment can be a vacuum; an inert atmosphere, such as a helium or argon atmosphere; a noncontaminating gas such as hydrogen; or mixture of noncontaminating gases, such as the reaction product gases from the chemical reaction by which the silicon was formed. For example, when silicon is produced by hydrogen reduction of silicon tetrachloride, the exhaust gas from the reactor is a mixture of hydrogen, hydrogen chloride, and unreacted silicon tetrachloride. Such a mixture would be useful as a non-contaminating environment in the process of this invention.

The high frequency generating equipment for the induction coil will vary with the conditions of operation. For example, with up to a ¾″ diameter melting zone, a vacuum tube oscillator generating alternating current at a frequency of 3 megacycles is used; with a melting zone with a diameter ranging from about ¾″ to 3″, a vacuum tube oscillator or a spark gap generator delivering current at a frequency of 450 kilocycles is used; for melting zones larger than 3″ in diameter, a spark gap or motor generator delivering current at a frequency of 20 kilocycles is used.

The nonconducting materials suitable for use in the container include silica, alumina, mullite, zirconia, thoria and the like, silica being preferred. The shape of the melting container is not critical, but of course, it should not have constrictions which would prevent the removal of a silicon ingot which might be formed therein.

There are a large number of nonconducting (that is, dielectric) fluid coolants which can be contacted with the exterior wall of the melting container. Among these are water, liquid nitrogen, air, and fluidized silica powder in air. The preferred coolant, of course, is water because of its high heat capacity and low cost. Another good coolant is silica powder fluidized with air. The rate of flow of coolant is regulated to maintain the temperature of the melting container below the melting point of silicon and preferably below about 1100° C. The most convenient procedure for contacting the fluid coolant with the exterior wall of the melting container is to simply have the container situated within a tank or jacket which has an inlet and outlet for introducing and withdrawing the fluid coolant. This is the procedure shown in the drawing. However, it is not essential that the fluid coolant be contained; cooling can be accomplished by having a flowing film of the coolant in contact with the exterior surface of the melting container.

Elemental silicon of very high purity is usually used as the feed for the melting process. Silicon obtained from the vapor phase reduction of silicon tetrachloride is especially suitable since it can be obtained in high purity. Doped silicon (silicon containing small, controlled amounts of certain elements which impart desired semiconductor properties) can also be used in the invention.

The initial conductivity of the silicon depends on the character of the silicon being melted. Thus, purposely doped semiconductor silicon or semiconductor silicon containing even a very small atom concentration of elements such as aluminum, boron, indium, phosphorous, and the like, exhibit considerably higher electrical conductivity than much purer silicon. Such silicon can be melted by using a large expenditure of power, without an initial preheating of the silicon as indicated in the prefered procedure. In any case, when an initial portion of the silicon is or becomes sufficiently conducting and is inductively heated to a high temperature, close to or above the melting point, radiation from hot silicon itself can serve to raise the temperature of additional silicon being subjected to or introduced into the electromagnetic field of the induction heating coil.

Since it is obvious that many changes and modifications can be made in the above-described details without departing from the nature and spirit of the invention, it is to be understood that the invention is not to be limited to said details except as set forth in the appended claim.

This case is a continuation-in-part of my copending application Ser. No. 568,870, filed March 1, 1956, now abandoned.

I claim:

The method of progressively melting and solidifying a mass of silicon which comprises supporting said silicon in a clear fused silica or clear fused quartz vessel in an inert atmoshere, heating a portion of said mass to a temperature above the melting point of silicon by inducing heating currents in said portion from a high frequency or radio frequency induction energy source, moving said silicon relative to said source to permit progressive melting and solidifying of at least a substantial portion of the mass of silicon and simultaneously with said heating step maintaining the container walls at a temperature below the melting temperature of the silicon by causing a liquid, non-conducting coolant to flow in contact with the external surfaces of the walls of said vessel.

References Cited in the file of this patent

UNITED STATES PATENTS

| | | |
|---|---|---|
| 1,612,628 | George | Dec. 28, 1926 |
| 2,443,542 | Ohl | June 15, 1948 |
| 2,467,889 | Harter | Apr. 19, 1949 |
| 2,475,810 | Theuerer | July 12, 1949 |
| 2,667,722 | Jenkins | Feb. 2, 1954 |
| 2,686,212 | Horn et al. | Aug. 10, 1954 |
| 2,789,039 | Jensen | Apr. 16, 1957 |
| 2,792,438 | Dunn | May 14, 1957 |
| 2,872,299 | Celmer et al. | Feb. 3, 1959 |
| 2,875,556 | Vigna | Mar. 3, 1959 |
| 2,930,098 | Emeis | Mar. 29, 1960 |